Patented Apr. 12, 1949

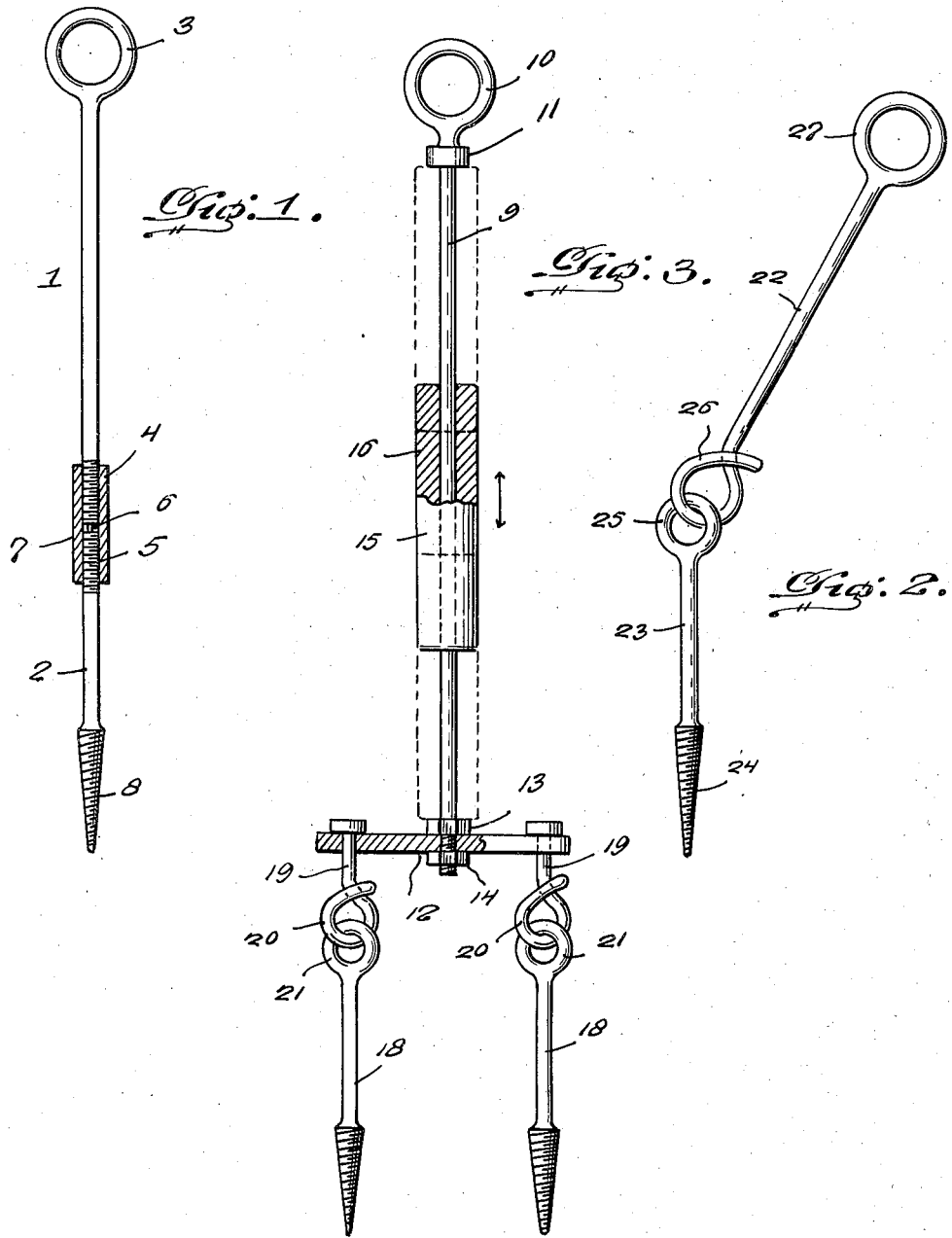

2,466,845

UNITED STATES PATENT OFFICE 2,466,845

PACKING REMOVING TOOL

Garner T. Ghee, New York, N. Y., and Catherine Thomas, Jersey City, N. J.

Application July 17, 1945, Serial No. 605,526

1 Claim. (Cl. 81—8.1)

The present invention relates to tools and is more particularly concerned with tools to remove solidified or otherwise impaired packing rings from glands of valves, stuffing boxes, cylinders, expansion joints and the like wherever a soft seal is used to prevent leakage.

Experience has shown that in the course of time such packing becomes very hard, due to friction, compression, heat or the lack of lubrication and thus impaired. In such cases the packing must be removed and replaced by new packing in order to promote efficiency of the parts affected. Heretofore the chief difficulty with devices for extracting old packing rings has been impracticability. They fail to obtain a firm hold on the packing and eventually it has to be removed in piecemeal by sharp picks.

The primary object of this invention is to provide a tool for readily and effectively extracting the impaired packing.

Another object of the invention is to provide a simpler and more compact tool than prior devices.

With the foregoing and other objects and advantages in view, the invention consists of the novel construction and arrangement of parts hereinafter described and claimed.

In the accompanying drawings illustrating the invention,

Figure 1 is a front elevation of the device with the coupling-sleeve shown in longitudinal section.

Figure 2 is a modified form of the invention with some elements shown in section.

Figure 3 is a front elevation of another modified form of the invention.

Like numerals are used in the description and drawings to designate the same parts of construction.

In the form of the invention shown in Figure 1, the two members 1 and 2 are constructed of round metal, preferably steel, of suitable diameter and rigidity to maintain the shapes into which fashioned for the purposes hereinafter stated. At one end the member 1 is shaped into a loop 3 to serve as a handle and it is adapted for insertion of the index finger to give the member either a turning or pulling movement. At the other end the member is threaded exteriorly for engagement with the coupling sleeve. The member 2 is exteriorly threaded from the upper end to a suitable distance, as at 5, to correspond with the threads on the member 1 and is provided at its top with a transverse, rectangular groove 6. The two members are joined by a cylindrical, interiorly-threaded coupling-sleeve 7. The other or lower end of member 2 is tapered, as at 8, to a sharp point and the tapered part is exteriorly threaded. When members 1 and 2 are united, the point of member 2 may be forced into the old packing ring by downward pressure on the handle of member 1 or by tapping on the handle with a hammer, wrench or other light tool. When the point has been forced into the packing ring the member is turned a sufficient number of times to screw the end of member 2 into the packing ring. A pull is then given to member 1 and the packing is extracted. If the member 2 should break and leave a part in the sleeve 6, or should stick in the sleeve, it can be removed with a suitable screw driver.

In the modified form of the invention illustrated in Figure 3, provision is made for twin engaging points for the fastening member and a tapping device on the holding and pulling member is supplied to facilitate the penetration of the fastener points.

9 designates the turning and pulling member which is constructed of round steel of suitable diameter and rigidity. It is provided with a finger loop 10 at the top and a fixed collar 11 adjacent thereto to limit the upward movement of the slidable weight. The lower end is threaded centrally into a metallic cross-piece 12 and secured to same by upper and lower nuts 13 and 14. The upper nut serves also as a stop for the weight. Mounted to slide on member 9 is a tubular, weighted sleeve 15 provided with a central smooth-bore aperture 16. This sleeve is of suitable length and weight to serve the purposes of a light hammer in tapping the fastener points of the dual members 18 into firm engagement with the packing ring to be removed. Also, the weight may be used reversely to hammer against the collar 11 to withdraw the packing after the members 18 are threadedly secured thereto. The members 18 are made of round steel of the same diameter and rigidity as those of the fastening member 2 of the first described form of the invention and are provided with similar threaded, tapered ends. The two arms of cross-piece 12 are provided with smooth-bore apertures for the reception of the short shanks 19 of connectors, the lower ends of which are formed with open loops 20 adapted to link with the closed loops 21 on the upper ends of said members 18. The shanks are provided with heads adapted to impinge the upper surface of cross-piece 12.

In operation, the threaded points of the fastening members 18 are initially forced into light engagement with the packing ring by downward pressure on member 9, aided, if necessary, by tapping with the slidable weight 15. Thereafter, the open loops 20 are disengaged from the closed loops 21 and the members 18 are separately firmly threaded into the packing. The connectors are now re-connected to the closed loops 21. The member 9 is then pulled up by either the handle 10 or by tapping on collar 11 with the weight 15, whereby the packing is readily extracted.

Another modification of the invention is illustrated in Figure 2. The pulling member 22 and fastening member 23 are joined by a flexible coupling instead of the rigid coupling 7 of the form of invention shown in Figure 1 and the hammer weight 15 of the modification shown in Figure 2 is dispensed with. The members 22 and 23 are constructed of round steel such as is employed in the other forms of the invention. Member 23 is provided with a threaded, tapered end 24 similar to the tapered ends in the other forms of invention and a closed loop 25 at the top end adapted to engage with an open loop 26 on the bottom end of member 22. This loose joint permits an angular application of turning force to the member 23 so as to operate the extractor on packing rings in places awkward to work on. The top of the member 22 is formed with a finger loop 27 for the purposes hereinbefore explained.

Having thus described our invention what we claim as new and desire to secure by Letters Patent, is:

In a tool for extracting packing, the combination with at least two elongated fasteners each formed to provide a closed loop at one end and a threaded tapered opposite end adapted to threadedly engage packing, of a pulling member, said member having an upper end formed to provide a handle, a rigid cross-piece including at least two laterally oppositely-directed arms, said pulling member having a lower end, means rigidly connecting said cross-piece to said lower end of said pulling member at right angles thereto, each of said arms being formed with at least one opening therethrough, a pair of connectors each including a straight shank slidable in each opening, said connectors each including an enlarged head limiting sliding movement of each shank in one direction, said connectors each including a lower end formed to provide an open loop adapted to be readily detachably connected to said closed loop of one of said fasteners, and a tubular weight slidable on said pulling member between said handle and said cross-piece.

CATHERINE THOMAS.
GARNER T. GHEE.

REFERENCES CITED

The following references are of record in the file of this patent:

UNITED STATES PATENTS

| Number | Name | Date |
| --- | --- | --- |
| 1,108,059 | Zihler | Aug. 18, 1914 |
| 1,140,082 | Stapley | May 18, 1915 |
| 1,458,076 | Potts | June 5, 1923 |
| 1,504,037 | Furman et al. | Aug. 5, 1924 |
| 1,662,538 | Richmond et al. | Mar. 13, 1928 |
| 2,421,324 | Graham | May 27, 1947 |